United States Patent
Levin et al.

(10) Patent No.: US 7,866,699 B2
(45) Date of Patent: Jan. 11, 2011

(54) STEERING-COLUMN ASSEMBLY

(75) Inventors: Christian Levin, Bendestorf (DE);
Maik-Oliver Schuette, Delingsdorf (DE); Peter Von Ey, Hamburg (DE)

(73) Assignee: Daimler AG, Stuttgart (DE)

( * ) Notice: Subject to any disclaimer, the term of this patent is extended or adjusted under 35 U.S.C. 154(b) by 616 days.

(21) Appl. No.: 11/661,415

(22) PCT Filed: Aug. 26, 2005

(86) PCT No.: PCT/EP2005/009212
§ 371 (c)(1),
(2), (4) Date: Feb. 22, 2008

(87) PCT Pub. No.: WO2006/024459
PCT Pub. Date: Mar. 9, 2006

(65) Prior Publication Data
US 2008/0252057 A1 Oct. 16, 2008

(30) Foreign Application Priority Data
Sep. 1, 2004 (DE) .................. 10 2004 042 283

(51) Int. Cl.
*B62D 1/00* (2006.01)
(52) U.S. Cl. ...................... 280/777; 280/779
(58) Field of Classification Search .......... 280/777, 280/779
See application file for complete search history.

(56) References Cited

U.S. PATENT DOCUMENTS

| | | | |
|---|---|---|---|
| 5,425,553 A * | 6/1995 | Yazane et al. ............... 280/777 |
| 5,615,916 A * | 4/1997 | Fujiu et al. .................. 280/777 |
| 5,669,634 A * | 9/1997 | Heinzman et al. ........... 280/777 |
| 5,788,278 A * | 8/1998 | Thomas et al. .............. 280/777 |
| 5,944,348 A * | 8/1999 | Boyle et al. ................. 280/777 |
| 6,183,012 B1 * | 2/2001 | Dufour et al. ............... 280/777 |
| 6,224,104 B1 * | 5/2001 | Hibino ....................... 280/777 |
| 6,367,840 B1 * | 4/2002 | Duval et al. ................. 280/777 |
| 6,382,670 B2 * | 5/2002 | Badaire et al. .............. 280/777 |
| 6,530,600 B1 * | 3/2003 | Marxer et al. ............... 280/777 |
| 6,685,225 B2 * | 2/2004 | Hancock et al. ............. 280/777 |
| 7,367,589 B2 * | 5/2008 | Stuedemann et al. ........ 280/777 |
| 2003/0155760 A1 | 8/2003 | Laisement et al. |
| 2009/0120229 A1 * | 5/2009 | Shibazaki et al. ............. 74/492 |

FOREIGN PATENT DOCUMENTS

| | | |
|---|---|---|
| DE | 197 06 609 A1 | 8/1998 |
| DE | 10 2004 024 876 A1 | 4/2005 |
| GB | 2 368 819 A | 5/2002 |

OTHER PUBLICATIONS

International Search Report dated Nov. 7, 2005, including PCT/ISA/220 and PCT/ISA/237 with English translation of relevant portion (Twelve (12) pages).
German Office Action dated May 18, 2005 (Three (3) pages).

* cited by examiner

*Primary Examiner*—Toan C To
(74) *Attorney, Agent, or Firm*—Crowell & Moring LLP

(57) ABSTRACT

A steering assembly has a bracket fixed to a vehicle and a bracket carriage displaceably arranged on the bracket. The assembly can be reliably collapsed in the event of an accident and is simple and cost-effective to manufacture. The bracket carriage is attached to the bracket by way of an attachment embodied in one piece with the bracket and/or the bracket carriage.

19 Claims, 4 Drawing Sheets

STEERING-COLUMN ASSEMBLY

BACKGROUND AND SUMMARY OF THE INVENTION

This invention relates to a steering column assembly.

U.S. Patent Application Publication 2003/0 155 760 A1 discloses a steering column assembly that has a steering column which is secured via a bracket carriage to a bracket fixed to the vehicle. The bracket carriage is displaceably mounted on the bracket and is secured to the bracket by attachment means in such a way that the bracket carriage and bracket cannot be displaced in relation to one another when used in the intended fashion. If a force applied to the steering column assembly by a vehicle occupant exceeds a certain force, for example in the event of a crash, the attachment means become detached so that the bracket carriage is displaced in relation to the bracket. The steering column is displaced with the bracket carriage so that additional space is provided for the vehicle occupant. It is conceivable to provide a crash element which absorbs the defined amount of energy during the displacement of the bracket carriage in relation to the bracket.

The attachment means which are known from this document and which have the purpose of securing the bracket carriage to the bracket are composed of a plurality of elements. For example, a screw is provided which plugs through the bracket carriage and is screwed into the bracket which is fixed to the vehicle. Mechanical elements with different functions such as a nut, a spring, various washers, sleeves and recess elements are arranged around the screw. The attachment means carry out the task of securing the bracket carriage with respect to the bracket when, as already described above, the steering column assembly is used in the intended fashion. If a force which is applied to the steering column assembly exceeds a specific amount, the attachment means release the bracket carriage so that the latter can be displaced in relation to the bracket.

The present invention is based on the object of providing a steering assembly which can be reliably collapsed in the event of an accident and is simple and cost-effective to manufacture.

This object is achieved according to the invention by means of a steering column assembly having the features claimed.

Accordingly, the invention is distinguished by the fact that a steering column assembly having a steering column is mounted by means of a bracket carriage on a bracket which is arranged fixed to the vehicle, the bracket carriage being arranged so as to be displaceable relative to the bracket. In order to bring about freedom from play between the bracket carriage and bracket during use in the intended fashion, attachment means are provided for securing the bracket carriage to the bracket. According to the invention, these attachment means are integrally formed in one piece either to the bracket or the bracket carriage or to both components. In other words, the bracket and/or bracket carriage are configured or manufactured as mechanical components in such a way that they have elements which permit one component to be secured to the other component without the aid of additional attachment means. Configuring the attachment means in one piece provides the advantage of being able to reduce costs which would be incurred in manufacturing and mounting additional separate attachment elements. Since the attachment elements are dispensed with by integrating the attachment function into the bracket carriage and bracket components, these costs can be eliminated, which provides a considerable potential for savings, in particular in the case of a series-manufactured product such as a steering column.

According to one embodiment, the attachment means can produce a detachable connection between the bracket and bracket carriage. This provides the advantage that the connection between the bracket carriage and bracket can be released at a specific time so that relative movement between the bracket carriage and bracket is made possible. This may occur, for example, in the case of a crash in which a force which exceeds a predetermined amount is applied to the steering column assembly. The attachment means can then be configured in such a way that they do not release the connection between the bracket and bracket carriage until the force which is applied from the outside exceeds the specific amount.

It is conceivable for the attachment means to be configured as face pairings that interact with one another. Furthermore, it is possible to produce a certain degree of stress between the components, depending on which position the components assume with respect to one another. In particular, stress can be built up between the two components if one of the components becomes deformed during the mounting process. Prestress which connects the two components to one another is brought about through such deformation. The components which are to be connected to one another can be moved in relation to one another, for example, until a predetermined force level is developed, at least one of the components being deformed during this movement. The particular advantage of such a connection is to be seen in the fact that very secure anchoring with simultaneous rigidity of the module can be brought about.

The attachment means can be composed of interacting faces which have angles which are matched to one another. During the mounting process, it is thus possible to predefine a specific direction which the components assume if they are displaced with respect to one another during the mounting process. If a stay is also provided, a tension or a surface pressure between the two components can easily be established by means of the interacting faces and this stay. It is also conceivable for one component to have oblique faces and the other to be deformed by interacting with the oblique faces during mounting.

In order to set the surface pressure it is conceivable to match the materials of the faces and of the deforming components precisely to one another. This is possible, for example, by manufacturing the entire components from corresponding materials. It is likewise conceivable for the surfaces of the interacting faces to be coated with corresponding materials. Selective configuration of the surfaces of the faces which interact with one another in order to set a defined surface pressure is also conceivable.

So that the connection between the steering column and bracket is maintained if the bracket carriage is displaced relative to the bracket, the bracket carriage can have a holder which is mounted in such a way that at the end of the movement of the bracket carriage in relation to the bracket it brings about a secure connection between the steering column and bracket by means of the bracket carriage. The holder can be embodied in at shape and can be manufactured as a sheet metal clip from the same material as the carriage. A guide which is adapted to the sheet metal clip and which is configured in such a way that reliable connection between the bracket and bracket carriage is ensured can be provided in the bracket. The sheet metal clip in the bracket carriage is an easy-to-manufacture connecting element if the bracket carriage is also made of sheet metal. In order to manufacture the sheet metal clip all that has to be done is to merely adapt the shape of the tool correspondingly. The same applies to the guiding in the bracket. If the bracket is manufactured by means of an injection molding method, the mold simply has to be correspondingly adapted. There are no additional work steps which would have to be carried out during the manufacture.

It is conceivable to secure the bracket carriage to the bracket by means of additional tear off pins. Tear off pins provide the advantage that the tear off force or the force of the crash, that is to say the force above which the bracket carriage moves relative to the bracket, can easily be set in a precise fashion. In addition, tear off pins are components which are easy to manufacture and easy to mount. It is conceivable to build up part of the force of the crash by means of the prestress which is set between the components. The remaining proportion can be generated by means of the tear off pins. The system both reduces the number of components and has the advantage that it can be adjusted satisfactorily.

The invention will be explained in more detail below with reference to the exemplary embodiment illustrated in the drawings.

DETAILED DESCRIPTION OF THE INVENTION

Figure 1:
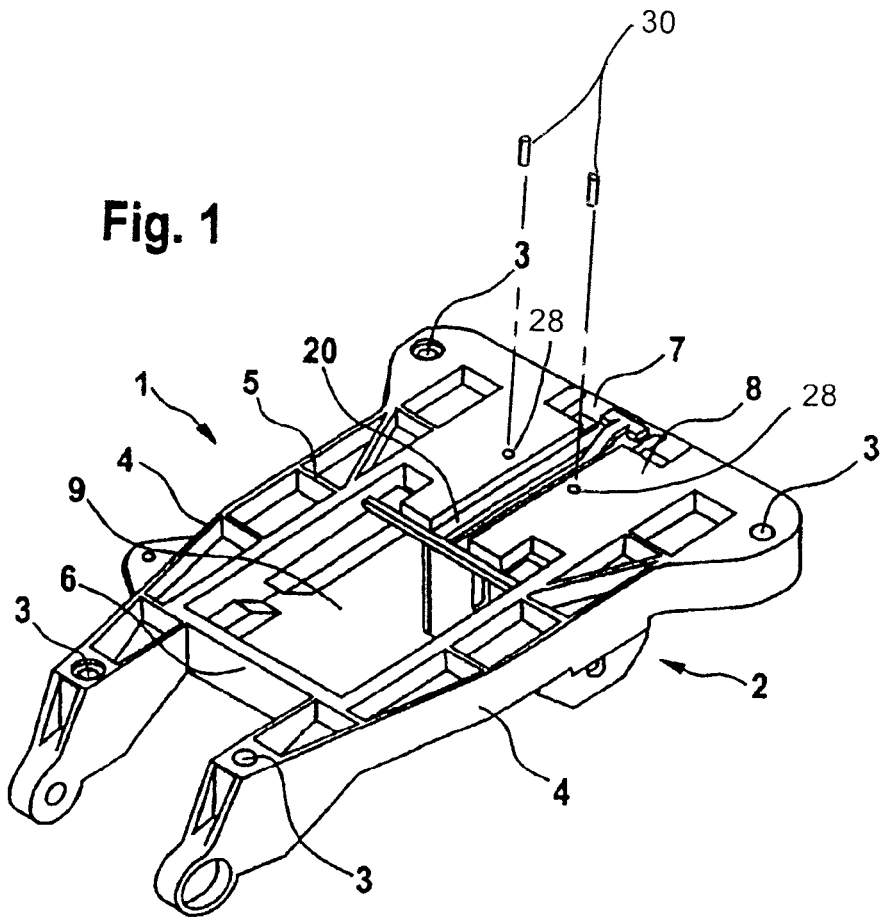
FIG. 1 is a three-dimensional illustration of a bracket with a bracket carriage in the operating state.
Figure 2:
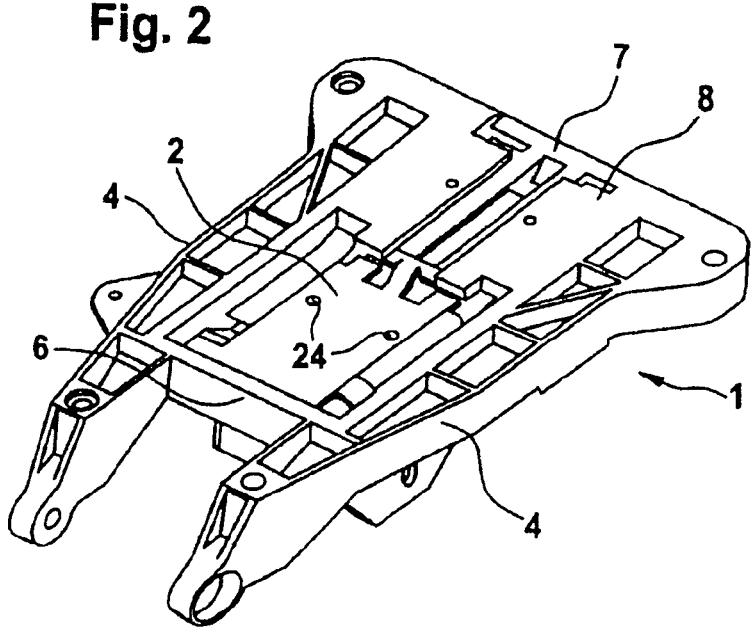
FIG. 2 is a three-dimensional illustration of a bracket with a bracket carriage in the crash state.

FIGS. 1 and 2 illustrate a bracket 1 with a bracket carriage 2 of a steering column assembly (not illustrated). The bracket 1 is arranged fixed to the vehicle by means of recesses 3 with attachment means (not illustrated in more detail). The bracket carriage 2 is displaceably mounted on the bracket 1. A steering column (likewise not illustrated) is attached using clamping means (known from the prior art) to the bracket carriage 2, which is described in detail below.

The bracket 1 has an essentially rectangular base body. The base body is composed of two longitudinal struts 4 which are arranged parallel to one another and have reinforcing ribs 5. The longitudinal struts 4 are connected to one another at one of their ends by means of a transverse strut 6. At their other end the connection is produced by means of a transverse strut 7 and a cover 8. Since the cover 8 does not extend over the entire length of the bracket 1, a cutout 9 is produced between the transverse strut 6 and the cover 8. The cover 8 has a guide 20 for receiving a holder 17. The cover 8 is embodied so as to be divided in two for the guide 20. The thickness of the cover 8 is reduced at the edges of the passage.

The method of operation of the assembly according to the invention is explained in more detail below in conjunction with FIGS. 1 and 2. The operating state of the arrangement, that is to say the state during an intended use of the steering column assembly, is illustrated in FIG. 1. In this case, the bracket carriage 2 is fixedly connected to the bracket 1 so that the steering wheel is arranged free of play in the vehicle. In this state, only the steering wheel can be adjusted, for comfort purposes. This position is made possible using the clamping means, which have already been mentioned and are known from the prior art, and this position will not be described in more detail here. If, in the event of a crash, a force is applied to the bracket carriage 2 via the steering wheel and the steering column and this force exceeds a predetermined amount, the connection between the bracket carriage 2 and the bracket 1 becomes detached so that the bracket carriage 2 is displaced in relation to the bracket 1 and assumes the position illustrated in FIG. 2. During the displacement, the energy of the crash is reduced to a defined degree by a crash element. Since the steering column is attached to the bracket carriage 2, it moves in the same way and additional space is produced in the passenger compartment of the vehicle. As is described in more detail below, the bracket 1 and bracket carriage 2 are embodied in such a way that in the case just described the bracket carriage 2 can carry out a defined movement in relation to the bracket 1 after the connection between the bracket carriage 2 and the bracket 1 has been released.

Figure 3:
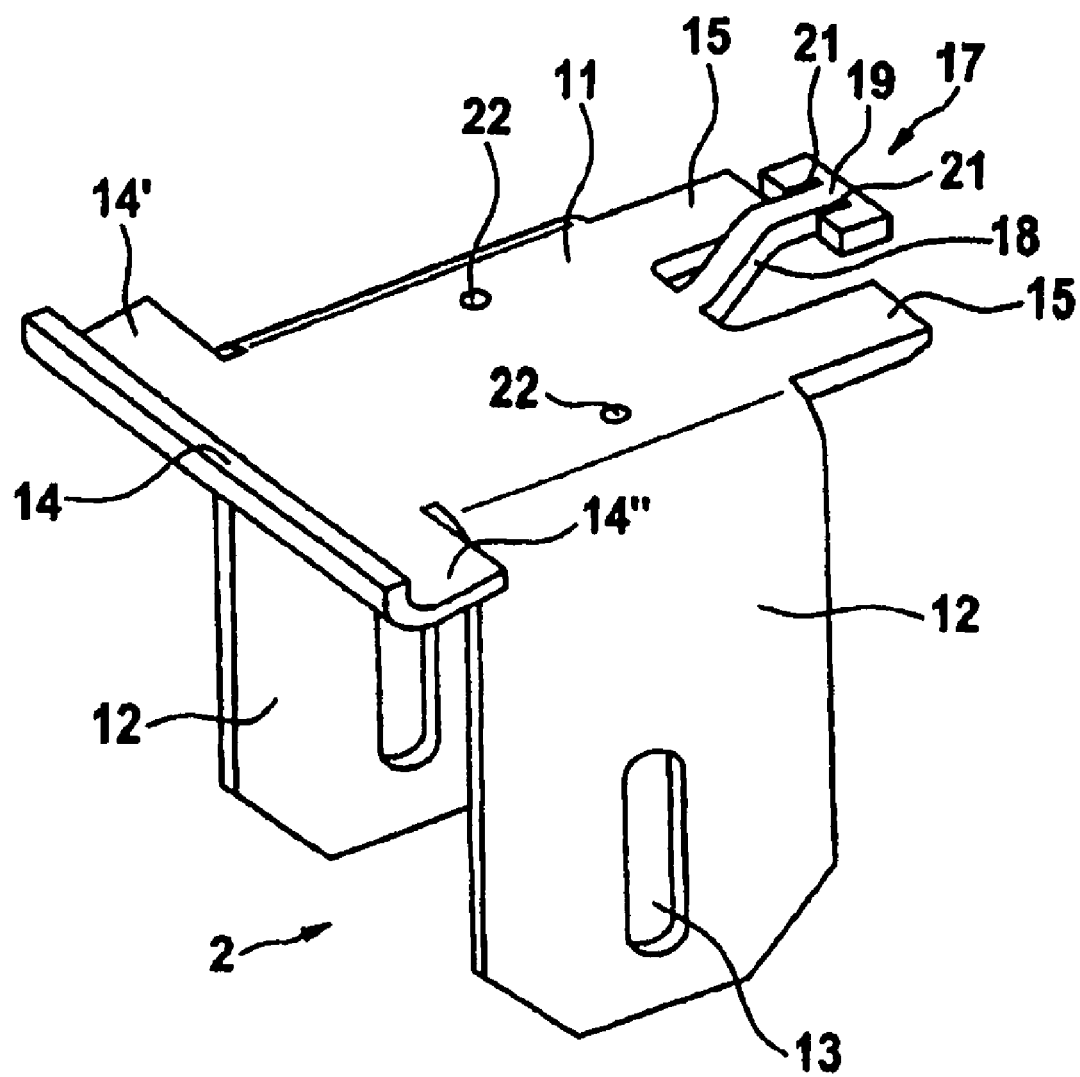
FIG. 3 is a three-dimensional illustration of a bracket carriage.

FIG. 3 illustrates the bracket carriage 2. The latter has a baseplate 11 which is oriented horizontally in the mounted state. Two limbs 12 extend at an angle of approximately 90° on both sides of the baseplate 11. The two limbs 12 are oriented parallel to one another. Each limb 12 has an elongate hole bore 13 which is used to hold the clamping means (not illustrated).

In addition, various sheet metal clips which extend on different sides of the bracket carriage 2 and are described in more detail below are arranged on the baseplate 11 of the bracket carriage 2. In the illustration according to FIG. 3, a sheet metal clip 14 extends to the left from the baseplate 11. The sheet metal clip 14 is bent upward at its outer end in order to provide reinforcement. The lower face of the sheet metal clip 14 is bent somewhat downward with respect to the plane in which the baseplate 11 is located, which is described in more detail in conjunction with FIG. 5. The sheet metal clip 14 is wider than the baseplate 11 so that two lateral tabs 14' and 14" extend over the width of the baseplate 11.

Two sheet metal clips 15 are arranged at that end of the baseplate 11 of the bracket carriage 2 which points to the right in the illustration. The sheet metal clips 15 are narrower than the baseplate 11 and are arranged on its outer sides so that a free space is produced between them. The sheet metal clips 15 extend in the same plane as the baseplate 11. They do not extend beyond the width of the baseplate 11. At their outer end pointing away from the baseplate 11 they are slightly chamfered, which is also described in more detail in conjunction with FIG. 5. A further sheet metal clip 17, which is of t-shaped construction, is provided between the sheet metal clips 15 in the free space 16. The t-shaped clip 17 functions, in the case of a crash, as a holder which ensures that the bracket carriage 2 is connected to the bracket 1 after the crash. The holder 17 is composed of a base web 18 and a transverse web 19. The base web 18 is of bent design. One of its ends is arranged on the baseplate 11. The other end, which is connected to the transverse web 19, extends above the plane of the baseplate 11. In the operating state, the transverse web 19 of the holder 17 does not have any contact with the guide 20 in the cover 8 of the bracket. It serves to prevent the bracket carriage 2, and thus the entire steering column, from tilting downward after the end of the crash process. The base web 18 can be bent both in an s shape, as in the illustrated exemplary embodiment, and also easily in the upward direction. The transverse web 19 has (in the embodiment illustrated) two slots 21 in an extension of the outer sides of the base web 18. It is also conceivable to embody the transverse web 19 without the slots 21. The holder 17 is assigned to the guide 20 in the cover 8. In the process, the base web 18 extends through the passage of the guide. The two wings of the transverse web 19 extend in the part of the cover 8 which has a reduced thickness.

Two bores 22 are provided approximately in the centre of the baseplate 11. They are both arranged at the same distance from the respective edges of the baseplate 11 and serve to receive tear off pins 30 (schematically illustrated in FIG. 1) whose function will be described later. The number of bores can be adapted to the respective application. It is also possible, for example, to provide four bores.

Figure 5:
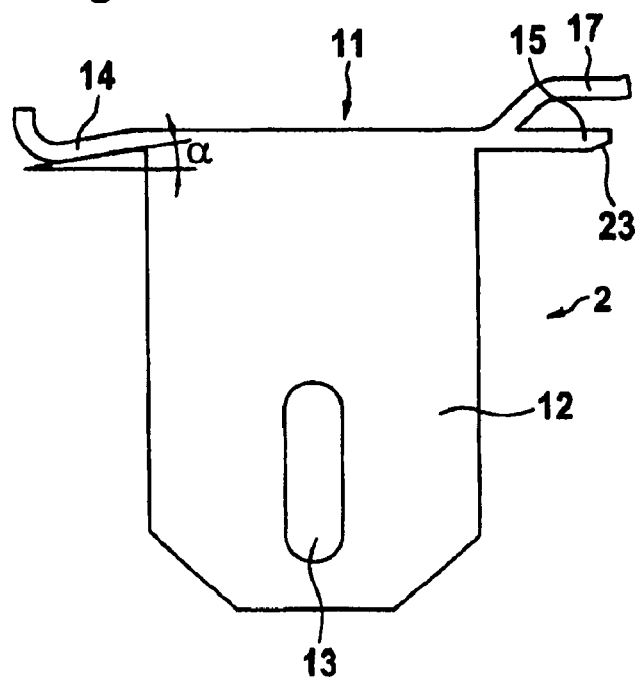
FIG. 5 is a side view of a bracket carriage.

In FIG. 5, the bracket carriage 2 is illustrated in a side view. The outward pointing face of a limb 12 with an elongated bore 13 can be seen. The baseplate 11 of the bracket carriage 2 extends transversely upward in a way which is concealed by the limb 12. The sheet metal clips 14, 15 and 17 extend on both sides of the baseplate 11. The upwardly bent end can be seen clearly on the sheet metal cup 14. It is also possible to see that the downward pointing face of the sheet metal clip 14 is bent downward with respect to the plane in which the baseplate 11 extends, with the result that an angle α is produced between the plane of the baseplate 11 and the downward pointing face of the sheet metal clip 14.

The downward pointing ends of the sheet metal clips 15 have a chamfer 23, as has already been described in conjunction with FIG. 3. The chamfer 23 serves to ensure that the bracket 1 is not damaged during mounting. The angle α can be between 5° and 10°, for example.

Figure 4:
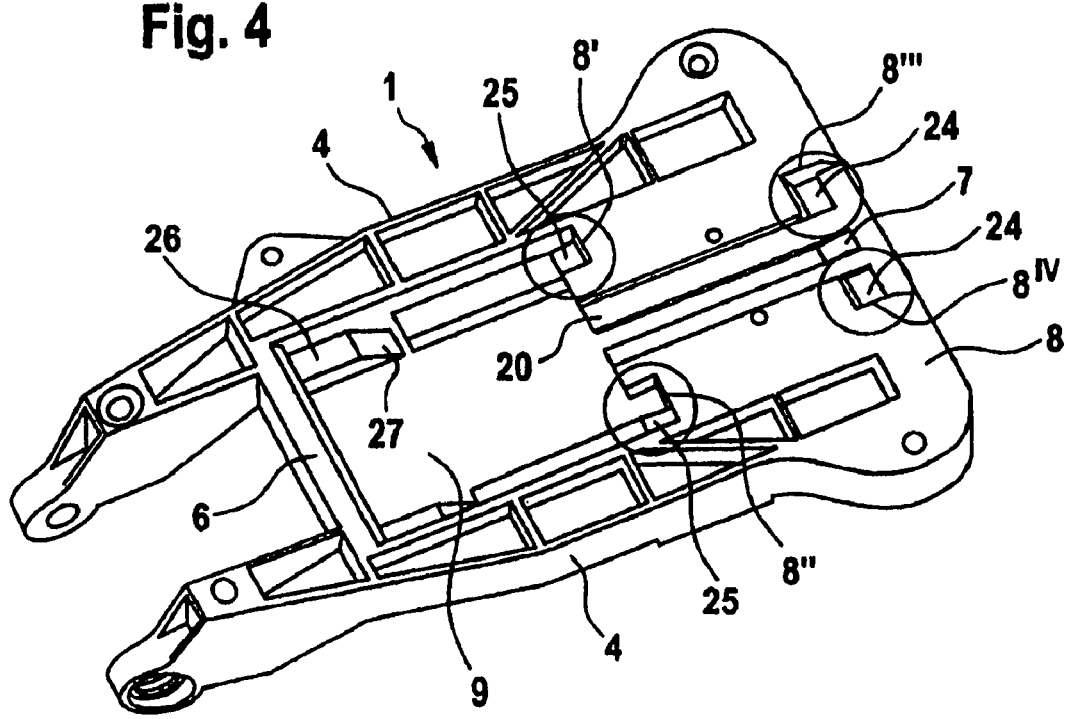
FIG. 4 is a three-dimensional illustration of a bracket.

The sheet metal clips 14 and 15 of the bracket carriage 2 interact with faces 24, 25 of the bracket 1 which are also arranged obliquely and are surrounded by circles in FIG. 4. The interaction will be described in more detail below. Running rails 26 are arranged on the longitudinal struts 4 of the bracket carriage 2, on their inward pointing sides. The running rails 26 extend along the longitudinal struts 4 from the transverse struts 6 to that end of the ramps formed by the faces 25 which are located on the cover 8. The running rails 26 extend on the outer edges of the cutout 9. The oblique faces 25 are themselves placed in the running rails 26 and arranged in the region of the cover 8 at the end of said running rails 26. In the region above the oblique faces 25, the cover 8 has in each case a cutout portion 8' or 8". The oblique faces 24 are provided directly in the transverse struts 7. Here too, the cover 8 has cutout portions 8''' or $8^{IV}$.

The running rails 26 have passages 27. The passages 27 correspond to cutout portions in the running rail 26 and are arranged obliquely with respect to the direction of extent of the running rails 26. They serve to simplify the mounting of the bracket carriage 2 on the bracket 1. They form the free space which is necessary to arrange the sheet metal clip 14 with its lateral tabs 14' and 14" in relation to the bracket 1 in such a way that, as illustrated in FIG. 4, they extend above the running rails 26.

Two bores 28 are provided in the cover 8 of the bracket 1. The bores 28 are provided in the cover 8 in such a way that in the mounted state of the bracket carriage 2 in the bracket 1 they extend precisely above the bores 22 of the bracket carriage 2 and likewise serve to receive the tear off pins 30.

Figure 6:
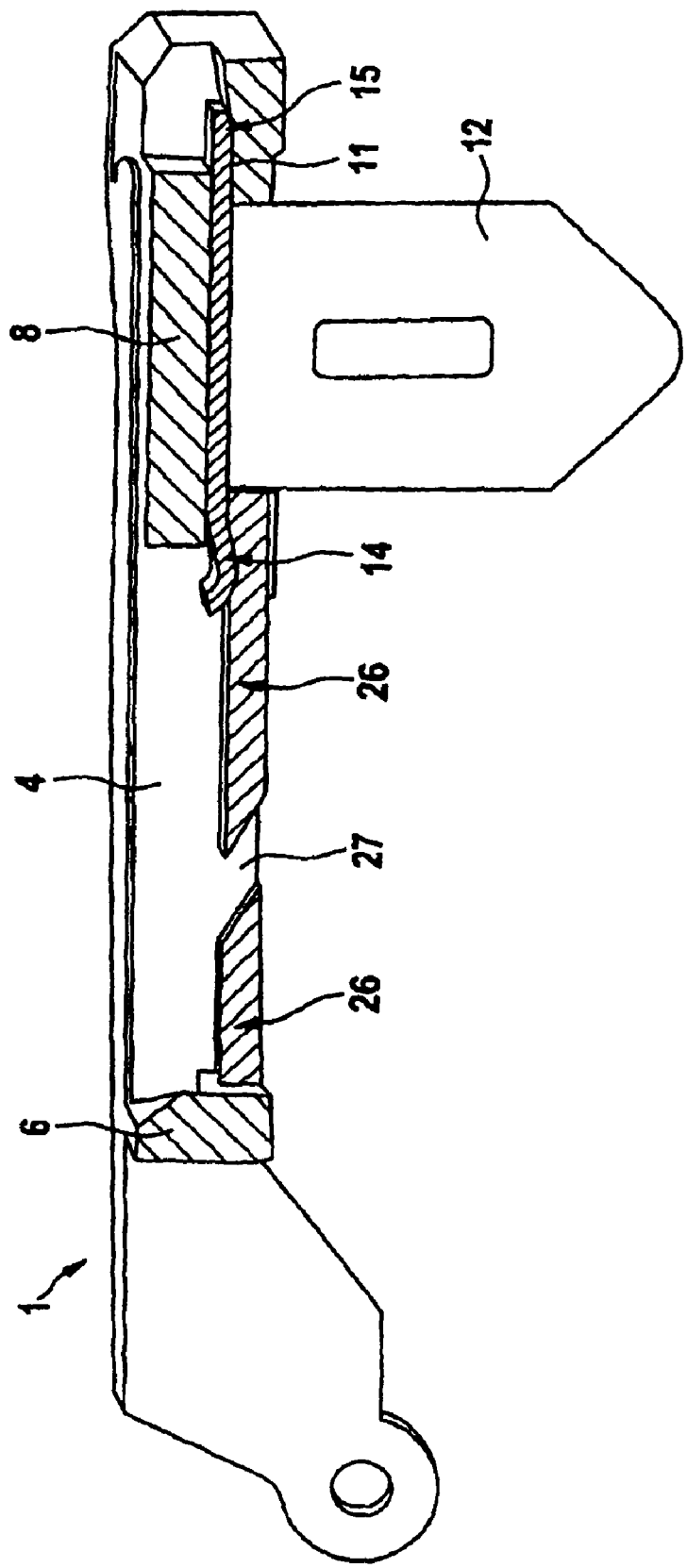
FIG. 6 is a cross section through a bracket with a bracket carriage in the operating state.

In the mounted position or in the operating state of the steering column assembly, the bracket carriage 2 is arranged with its baseplate 11 above the running rails 26. The sheet metal clips 14 and 15 come to rest here on the oblique faces 24 and 25 of the bracket 1, the chamfer 23 of the sheet metal clips 15 serving to prevent the ramps 24 in the transverse web 7 being damaged and ensuring that the bracket carriage 2 is fitted onto the ramps 24 easily. This operating state is shown in the sectional illustration in FIG. 6. The sectional illustration shows a view of the lateral face of the longitudinal strut 4 with the running rail 26 arranged in front of it, and the passage 27. At that end of the running rail 26 which points to the left, the sectioned transverse strut 6 is shown. At the right-hand end of the running rail 26, the sectioned transverse strut 7 is shown. The cover 8 is also illustrated in section and is arranged in the right-hand half of the bracket 1. The baseplate 11 of the bracket carriage 2 is shown above the running rail 26. The clip 15 points to the right, and the clip 14 to the left. The obliquely downward pointing face is shown underneath the clip 14.

During the mounting process, the bracket carriage 2 is slid along from right to left underneath the bracket 1 until the lateral tabs 14' and 14" of the sheet metal clip 14 come to the passages 27. The lateral tabs 14' and 14" are guided obliquely upward through the passages until the entire sheet metal clip is arranged above the running rail. To do this, the bracket carriage 2 is positioned obliquely. After this, the bracket carriage 2 is moved from the oblique position into a horizontal position. In this context, horizontal position means that the baseplate 11 is arranged parallel to the direction of the main extent of the bracket 1. The bracket carriage 2 is then moved to the right again. In the process, on the one hand the sheet metal clips 15 are pushed onto the oblique faces 24, and on the other hand the outer ends of the sheet metal clip 14 are pushed onto the oblique faces 25. The sheet metal clips 15 are pushed upward in the process. They match their orientation to the oblique faces 24. The deformation of the sheet metal clips 15 takes place here both elastically and plastically. The downward pointing faces of the sheet metal clips 14 come to rest on the oblique faces 25. The further the bracket console 2 is pushed with its sheet metal clips 14 and 15 onto the oblique faces of the bracket 1, the greater the force with which the baseplate 11 is pressed against the cover 8. As a result, the play-free connection is established between the bracket carriage 2 and the bracket 1. Surface pressure is built up between the bracket carriage 2 and the bracket 1. The surface pressure is produced between the interacting faces of bracket carriage 2 and bracket 1 as well as between the upper side of the baseplate 11 and the cover 8. In the process, part of the surface pressure arises as a result of the elastic component of the bending in the clips 15. The plastic component in the deformation of the sheet metal clips 15 is used to compensate for the tolerances. Depending on the pairing of materials of the bracket carriage 2 of the bracket 1, a self-locking effect is produced between these components, which causes a relative movement to occur between the bracket carriage 2 and the bracket 1 only when a force which acts on the bracket carriage is exceeded.

In order to define more precisely the detachment between the bracket carriage 2 and bracket 1, these two components can additionally be connected to one another by means of tear off pins 30 which extend through the bores 28 and 22.

The method of functioning the invention will be summarized once more in other words. In order to ensure compensation of tolerances or elimination of play and secure connection between the bracket carriage 2 and the bracket 1, the sheet metal clips 14, 15 which are integrated in the bracket carriage 2 during the mounting process are pushed onto the bracket-end ramps 24, 25 against the cover 8 in the bracket 1 and they press the bracket carriage 2 against the cover 8 of the bracket 1 and thus generate a defined surface pressure. As a result, the play in the system is reduced to zero and the bracket carriage 2 is secured. The angle of the ramps 24, 25 or of the oblique faces of the sheet metals clips 14, 15 is matched to the sliding properties of the pairing of materials in such a way that the system is self-locking. In addition, the system is secured by virtue of the fact that after the mounting process bores 22, 28 are formed in the bracket cover 8 and bracket carriage 2 and said bores receive the tear off pins 30 which shear off in the event of a crash. The prestressing of the system is configured in such a way that in the operating state (cf. FIG. 1) it is capable of absorbing steering wheel-end forces from misuse. As soon as, in the event of a crash, a defined force which is higher in absolute terms than the forces of misuse, the plastic pins 30 shear off. At the same time, the sheet metal clips 14, become detached from the oblique faces 24, 25, as a result of which a crash path is cleared. During the crash, the bracket carriage 2 is guided through a path in the bracket 1 which is formed by the running rails 26 and the cover 8. The energy from the impact can be absorbed here by travel-dependent deformation of a crash element (not illustrated).

The invention claimed is:

1. A steering assembly comprising:
a bracket fixed to a vehicle,
a bracket carriage displaceably mounted on the bracket and having limbs for attachment to a steering column of the steering assembly,
attachment means for attaching the bracket carriage provided on the bracket, and
at least one element receivable in aligned bores in the bracket and the bracket carriage to additionally connect the bracket and the bracket carriage together normally but shear off in the event of a crash,
wherein the attachment means are at least partially defined by the bracket.

2. The steering assembly as claimed in claim 1, wherein the attachment means are composed of face pairings which interact with one another.

3. The steering assembly as claimed in claim 2, wherein the bracket carriage has at least one integrally formed holder.

4. The steering assembly as claimed in claim 1, wherein the attachment means are faces which are matched to one another in terms of angles.

5. The steering assembly as claimed in claim 4, wherein materials of the faces are matched to one another.

6. The steering assembly as claimed in claim 1, wherein the faces are matched to one another in terms of configurations.

7. The steering assembly as claimed in claim 6, wherein the bracket carriage has at least one integrally formed holder.

8. The steering assembly as claimed in claim 4, wherein the bracket carriage has at least one integrally formed holder.

9. The steering assembly as claimed in claim 5, wherein the bracket carriage has at least one integrally formed holder.

10. The steering assembly as claimed in claim 1, wherein the bracket carriage has at least one integrally formed holder.

11. The steering assembly as claimed in claim 1, wherein the at least one element is one of at least two tear off pins.

12. A steering assembly comprising:
a bracket fixed to a vehicle,
a bracket carriage displaceable mounted on the bracket and having limbs for attachment to a steering column of the steering assembly, and
attachment means for attaching the bracket carriage provided on the bracket,
wherein the attachment means are at least partially defined by the bracket,
wherein the bracket carriage has at least one integrally formed holder,
wherein the bracket has at least one guide, and
wherein the holder interacts with the guide in such a way that a reliable connection between the bracket and the bracket carriage is ensured.

13. A steering assembly comprising:
a bracket fixed to a vehicle,
a bracket carriage displaceably mounted on the bracket and having limbs for attachment to a steering column of the steering assembly, and
attachment means for attaching the bracket carriage provided on the bracket,
wherein the attachment means are at least partially defined by the bracket, and
wherein the bracket defines rails helping to guide bracket carriage movement during a crash.

14. The steering assembly as claimed in claim 13, wherein the attachment means produce a detachable connection between the bracket and the bracket carriage.

15. The steering assembly as claimed in claim 14, wherein the attachment means are faces which are matched to one another in terms of angles.

16. The steering assembly as claimed in claim 14, wherein the bracket carriage has at least one integrally formed holder.

17. The steering assembly as claimed in claim 14, wherein the at least one element is one of at least two tear off pins.

18. The steering assembly as claimed in claim 13, wherein the attachment means are composed of face pairings which interact with one another.

19. The steering assembly as claimed in claim 13, wherein the attachment means are faces which are matched to one another in terms of angles.

* * * * *